United States Patent Office 3,218,121
Patented Nov. 16, 1965

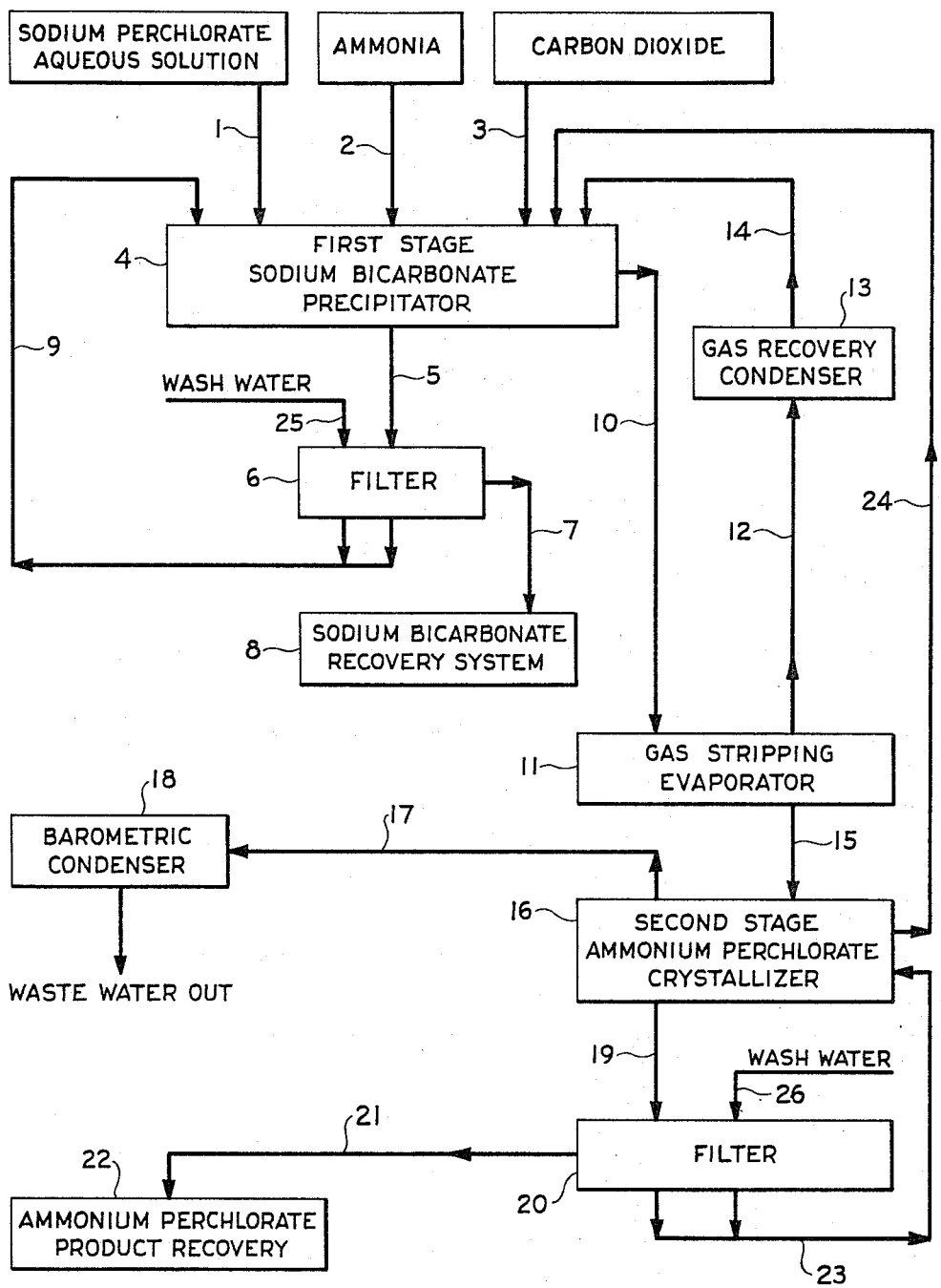

1

3,218,121
MANUFACTURE OF AMMONIUM PERCHLORATE
Lewis E. Tufts, Lewiston, N.Y., assignor to Hooker Chemical Corporation, Niagara Falls, N.Y., a corporation of New York
Filed July 5, 1963, Ser. No. 292,839
12 Claims. (Cl. 23—85)

This invention relates to an improved process for the production of ammonium perchlorate from certain alkali metal and alkaline earth metal perchlorates, ammonia, carbon dioxide, and water.

Ammonium perchlorate is used as an ingredient in explosives, in pyrotechnic compositions, and as raw material for the production of perchloric acid and numerous metallic perchlorates, such as magnesium perchlorate. By far the predominant use for ammonium perchlorate is as an ingredient in the propellant compositions for solid fueled rockets. For this latter use, it is necessary that the ammonium perchlorate meet rigid requirements for chemical purity and for particle shape and size distribution.

In the United States, most of the ammonium perchlorate for rocket propellant use is made by the metathesis reaction between sodium perchlorate and ammonium chloride. In the process using this metathesis reaction, the ammonium perchlorate is usually crystallized in evaporatively cooled crystallizers. The art of controlling continuous evaporative crystallizers has developed over years of experience to a point where ammonium perchlorate of suitable chemical purity and particle shape is obtained from mother liquors containing dissolved sodium chloride substantially equivalent on a weight basis to the dissolved ammonium perchlorate. Moreover, suitable changes in various crystallizer operating parameters allow the particle size distribution of the product to be adjusted to meet many different particle size specifications for propellant grade ammonium perchlorate.

In Canadian Patent 631,947 and British Patent 912,953, R. P. Ayerst describes a process for producing ammonium perchlorate wherein sodium perchlorate is treated with ammonia and carbon dioxide to precipitate ammonium perchlorate. After filtering off the ammonium perchlorate, the mother liquor is treated with more carbon dioxide to react with the sodium carbonate therein and precipitate sodium bicarbonate, thereby removing the sodium ion. After the sodium bicarbonate has been filtered off, the mother liquor is evaporated to remove ammonia, carbon dioxide, and a portion of water, and the residual liquor containing sodium perchlorate and ammonium perchlorate is recycled to the initial stage of the process.

In this Ayerst process, it will be seen that the ammonium perchlorate is crystallized from a medium which contains a considerable concentration of ammonium carbonate or bicarbonate. As a consequence, the crystallizing medium exerts a considerable partial pressure of carbon dioxide and also of ammonia gas in the vapor space above it. This prevents the use of evaporatively cooled crystallizers, and makes necessary cooling with heat exchangers or possibly the scraped surface cooling devices of the art mentioned in the British and Canadian patent, for, if the use of an evaporatively cooled crystallizer were attempted, the carbon dioxide and ammonia would be preferentially evaporated from the system, thereby preventing formation of ammonium perchlorate.

When attempting to operate the process disclosed in the British and Canadian patents, I have been unable to crystallize ammonium perchlorate acceptable for rocket propellant use.

Therefore, it is an object of this invention to provide a process for the production of ammonium perchlorate acceptable for rocket propellant use by a route other than

2 the present ammonium chloride route, but which utilizes the evaporative crystallization techniques already developed in the art.

Another object is to provide a more economic process for producing ammonium perchlorate than is presently available.

A further object of this invention is to realize substantial benefits from a novel process having reduced corrosiveness of its process liquors by maintaining a high pH in most of the process liquors and by the substantial elimination of the chloride ion in the process.

It is a further object of this invention to provide a novel process which removes sodium from the process by precipitation as high quality sodium bicarbonate suitable for commercial use, or for conversion to sodium carbonate.

These and other related objectives are achieved by a two-stage process which comprises reacting sodium perchlorate, ammonia, carbon dioxide, and water in an aqueous medium in a first stage to form solid sodium bicarbonate, separating the precipitated sodium bicarbonate from the resultant mother liquor, and thereafter precipitating ammonium perchlorate from the said first stage mother liquor in a second stage by altering any combination of the parameters of temperature, concentration of ammonium ions, concentration of perchlorate ions, and water content of the aqueous medium. The mother liquor resulting from the separation of the precipitated ammonium perchlorate is suitable to be returned as raw material for the first stage of the process.

Thus, my process has some striking advantages over the processes of the prior art, including the ammonium chloride process. Less expensive raw materials are used. A more valuable by-product is produced. Corrosion is reduced by substantial elimination of the chloride ion, and by operation under conditions which are less acidic than the conditions of the chloride process. There is a marked reduction in the problem of supplying the reactants in their proper equivalents. In the ammonium chloride process, the ammonium chloride and sodium perchlorate must be supplied in their exact equivalents; otherwise that reactant which is supplied in excess will build up in the system, causing difficulties in the process operation. In contrast, in my process it is only necessary to add the ammonia in substantial excess of that which is equivalent to the precipitating sodium ion. By setting a pressure of carbon dioxide in contact with the reaction medium, the bicarbonate ion concentration automatically assumes a proper level. Excesses of ammonia and carbon dioxide are easily removed from the aqueous medium before the crystallization of ammonium perchlorate is conducted, by evaporation, for example.

FIRST STAGE

In the first or sodium bicarbonate precipitation stage, an aqueous solution of sodium perchlorate is treated with bicarbonate ion under suitable conditions of temperature and concentrations of reactants to yield a considerable fraction of the sodium ion precipitated as sodium bicarbonate, with substantially no accompanying precipitation of ammonium perchlorate. The bicarbonate anion is derived from ammonia, carbon dioxide, and water, and is maintained at a concentration level to induce precipitation of sodium bicarbonate. In this stage, the temperature and the concentrations of the ammonium ions and of the perchlorate ions are to be maintained at levels which do not induce precipitation of ammonium perchlorate. Under the conditions preferred in this stage, the sodium bicarbonate precipitation rate will be dependent primarily upon the feed rate of sodium perchlorate, all other variables remaining substantially constant.

The ammonium ion present in the first stage is derived from ammonia being fed as a gas or in aqueous solution, or is derived from recycle streams. The ammonium ion concentration must be equivalent to the sum of the excess of perchlorate ion concentration over sodium ion concentration plus the concentrations of carbonate and bicarbonate ions present in the solution. An adequate saturation with carbon dioxide assures that the ammonia will be substantially all converted to the ammonium ion. The concentrations of perchlorate ions and of ammonium ions in the first stage mother liquor are preferably chosen to maximize the ratio of perchlorate ion to sodium ion in the resultant clarified mother liquor.

In order to enhance the concentration of the bicarbonate ion, an elevated pressure of carbon dioxide is maintained on the reaction medium. Increased carbon dioxide pressures are required to maintain a sufficient concentration of bicarbonate ion when the precipitation is carried out at higher temperatures where the ammonium perchlorate has enhanced solubility. Within a temperature range from between about 10 to about 110 degrees centigrade, to obtain the desired bicarbonate ion concentration, the carbon dioxide pressure can be from somewhat below about one atmosphere to above about 20 atmospheres. When operating in a lower temperature range of from about 10 degrees centigrade to about room temperature, less than one atmosphere of carbon dioxide is needed to maintain a sufficient bicarbonate ion concentration. When operating in a temperature range of from about room temperature to about 50 degrees centigrade, the carbon dioxide pressure can be maintained between about one and about two atmospheres in order to have a sufficient bicarbonate ion concentration. The amount of carbon dioxide pressure to be used to obtain a sufficient bicarbonate ion concentration increases quite rapidly in the upper temperature range. Pressures less than one atmosphere or greater than 20 atmospheres may therefore also be used. I prefer to operate with a partial pressure of carbon dioxide between about 2 and about 4 atmospheres when operating within a preferred temperature range of between about 50 and about 90 degrees centigrade.

By conducting the sodium bicarbonate precipitation under properly controlled conditions of temperature and reaction rate, the sodium bicarbonate is precipitated in a readily filterable form essentially free from contamination with ammonium perchlorate and is, therefore, suitable for recovery as a saleable product such as soda ash or sodium bicarbonate. The sodium bicarbonate is removed from the precipitation stage in the form of a slurry, the pressure thereon is reduced to atmospheric pressure, and the slurry is then passed to a separation step where the solids are preferably filtered from the mother liquor. The sodium bicarbonate filter cake is then washed with water. The filtrate and wash liquor are preferably combined and then returned to the first crystallization stage.

Mother liquor is decanted from an unagitated zone in the first stage crystallizer and distilled to remove the carbon dioxide and volatile ammonia gasses along with some water (preferably enough to contain them in solution after condensation). This distillation may be run at any suitable pressure to yield a residual solution which, by cooling and/or further evaporation, deposits solid ammonium perchlorate in good purity and yield. I prefer to operate this evaporation at about atmospheric pressure, however sub-atmospheric or super-atmospheric pressures may also be used. The vapors are taken overhead and condensed in a recovery system, and the resulting valuable solution of ammonia and carbon dioxide preferably is recycled to the sodium bicarbonate precipitation stage.

SECOND STAGE

The residual solution from the evaporation, now substantially free of carbon dioxide and volatile ammonia, is then conveyed to the second precipitation stage. This is preferably effected in an evaporative crystallizer. This residual solution comprises ammonium perchlorate and sodium perchlorate in aqueous solution, and is substantially free of all other ions. Therefore, of the ions present in the mother liquor in this ammonium perchlorate chystallization stage, only sodium is foreign to the desired product. I have found that, by careful selection of the crystallizing conditions, the concentration of the sodium ion in this mother liquor can be maintained at a level no higher than is common practice in processes using the metathesis reaction between ammonium chloride and sodium perchlorate, which, as mentioned above, is almost universally employed in current practice for ammonium perchlorate production in the United States.

Although I prefer to use an evaporative crystallizer to effect the second stage precipitation, because it has been found effective in the metathesis process of the prior art, it is to be understood that this stage of my invention is not to be limited to evaporative crystallization. Other means of crystallization, including surface cooled equipment, can be used to carry out this step, especially if the product is not intended for rocket propellant use.

Since sodium perchlorate has a very high solubility in comparison to ammonium perchlorate, the conditions of ammonium perchlorate crystallization can be varied widely without co-precipitating sodium. Therefore, I can adjust the parameters of crystallization to yield a wide range of control over the crystal form and size distribution which render the product suitable for rocket propellant use.

In this ammonium perchlorate crystallization stage, I have found that the temperature should range from between about zero to about 130 degrees centigrade, with the preferred range being between about 35 and about 90 degrees centigrade. In the upper temperature ranges, I have found that there is a tendency for the solution to become acidic. Various means for maintaining the desired temperature can be employed. When an evaporative crystallizer is used, the vapors from the evaporative crystallizer are fed to a barometric condenser which is operated under a pressure that will give the desired temperature in the crystallizer. However, other means of temperature control can be used in the ammonium perchlorate crystallization stage, such as surface coolers.

It is to be understood that the evaporate crystallizer can have incorporated in it an internal heating means, and thereby increase the rate or degree of evaporation and the output of the crystallizer.

In the ammonium perchlorate crystallization stage, a slurry of crystals in the mother liquor is withdrawn and passed to a separation step where the solid ammonium perchlorate is preferably filtered from the mother liquor. The filter cake is washed with water. The filtrate and wash liquor are preferably combined and then returned to the second crystallization stage.

Mother liquor is decanted from an unagitated zone in the second stage crystallizer and preferably returned to the first stage of the process.

The sodium perchlorate used as feed to the process may be derived from any usual source. I prefer to use the sodium perchlorate cell liquor derived from the electrolysis of sodium chloride. However, solid sodium perchlorate may also be used by dissolving it in a sufficient quantity of aqueous medium to render it suitable for use in the sodium bicarbonate precipitation stage.

It is desirable that the ammonium perchlorate be crystallized under conditions which minimize contamination with other ions present in solution. The exact conditions of this crystallization will depend heavily upon the choice of equipment as well as the particular specification which the product is to meet.

It will be apparent that the process of this invention can be carried out with wide variations in such parameters as ion concentrations, temperatures, and partial pressures of volatile components in both the sodium bicarbonate precipitation stage and in the ammonium perchlorate crystallization stage.

While the process described herein is particularly useful in the preparation of ammonium perchlorate for rocket propellant use, it is to be understood that this invention is not to be restricted to this use. High quality ammonium perchlorate produced by the process of this invention is suitable for explosive or pyrotechnic compositions as well as other purposes for which amomnium perchlorate is known to be useful in the art.

The process of this invention may be carried out in a batch or in a continuous manner. Because of the economics and the greater uniformity of product realizable from a continuous process, the continuous mode of operation is preferred for large scale production.

In order that the invention may be better understood, the following illustrative examples are given, but I do not wish to be limited to them except as defined in the appended claims. All quantities are in parts by weight unless otherwise specified.

*Example 1—Ammonium perchlorate from sodium perchlorate*

Reference is made to the figure, which is a diagrammatic flow sheet of a preferred continuous mode of operation of this invention and will be referred to in this example.

A solution of 104.3 parts of sodium perchlorate dissolved in 60.5 parts of water is fed through line 1 into a sodium bicarbonate precipitator 4. Into this first stage reaction vessel 4 is also introduced 14.5 parts of ammonia through line 2. Carbon dioxide is additionally supplied to vessel 4 through line 3 in an amount sufficient to maintain about 30 pounds per square inch absolute partial pressure of carbon dioxide in the vapor space above the liquid level in the sodium bicarbonate precipitator 4. A recycle stream from the gas recovery condenser 13, comprising carbon dioxide in 107 parts of water and 19.8 parts of ammonia, is also introduced into the sodium bicarbonate precipitator 4 through line 14. The mother liquor recovered from the separation of the precipitated sodium bicarbonate on filter 6 and the wash liquor from washing the precipitated sodium bicarbonate on filter 6 are combined and returned to the sodium bicarbonate precipitator 4 through line 9. The effect of this return flow through line 9 is to add 44.3 parts of wash water to the sodium bicarbonate precipitator 4. In addition, second stage mother liquor decanted from an unagitated zone in the evaporative crystallizer 16 and comprising 179.5 parts of water, 27.1 parts of ammonium perchlorate, and 143.6 parts of sodium perchlorate is recycled through line 24 to the sodium bicarbonate precipitator 4.

The total flows into the sodium bicarbonate precipitator 4 are as follows:

| Compound: | Quantity fed in parts by weight |
|---|---|
| Water | 391.3 |
| Sodium perchlorate | 247.9 |
| Ammonia | 34.3 |
| Ammonium perchlorate | 27.1 |
| Carbon dioxide | Undetermined |

The sodium bicarbonate precipitator 4 is the first stage of the process and is maintained at approximately 75 degrees centigrade and is well agitated to obtain adequate mixing of the reactants, with the particular objective of facilitating absorption of carbon dioxide and the accompanying formation of bicarbonate ion. This is believed to proceed in accordance with the following reaction:

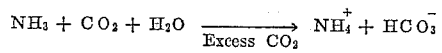

The concentration of bicarbonate ions produced and the concentration of sodium ions in the reacting medium are such that sodium bicarbonate is precipitated:

A summation reaction for stage one may be written as follows:

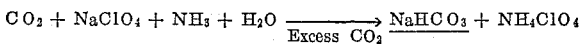

The temperature and the concentrations of the ammonium ions and of the perchlorate ions in the reaction medium of the sodium bicarbonate precipitator 4 are such that the ammonium perchlorate stays in solution.

A slurry of precipitated sodium bicarbonate in mother liquor is removed from the sodium bicarbonate precipitator 4 through line 5 and passed to filter 6. Adherent mother liquor is washed from the sodium bicarbonate filter cake with water fed through line 25, and 71.5 parts of sodium bicarbonate are transferred through a conveyor line 7 to the sodium bicarbonate recovery system 8, where it can be processed into saleable product, such as sodium bicarbonate or soda ash. The filtrate and the wash liquor from filter 6 are combined and recycled through line 9 to the sodium bicarbonate precipitator 4.

From an unagitated zone in the sodium bicarbonate precipitator 4, there is decanted through line 10 first stage mother liquor comprising 376 parts of water, 19.8 parts of ammonia (largely as ammonium bicarbonate), 127.1 parts of ammonium perchlorate, 143.6 parts of sodium perchlorate, and an undetermined amount of dissolved carbon dioxide which is passed through line 10 to the gas stripping evaporator 11.

In the gas stripping evaporator 11, 107 parts of water, 19.8 parts of ammonia, and an undetermined amount of carbon dioxide are volatized and conducted through line 12 to the gas recovery condenser 13.

In the gas recovery condenser 13 the volatilized materials from the gas stripping evaporator 11 are condensed with surface cooled heat exchange means or any other suitable cooling means.

From the gas stripping evaporator 11 there is also withdrawn residual solution comprising 127.1 parts of ammonium perchlorate and 143.6 parts of sodium perchlorate dissolved in 269 parts of water, which is conducted through line 15 to the evaporative crystallizer 16.

The second stage of the process is conducted in the evaporative crystallizer 16 wherein ammonium perchlorate is crystallized from solution by adjustment of the absolute pressure above the surface of the boiling liquid to maintain the temperature at approximately 40 degrees centigrade while 159.5 parts of water are evaporated and removed through line 17 to the barometric condenser 18. These conditions of temperature and concentrations of ammonium and of perchlorate ions in the evaporative crystallizer are such that the solubility of ammonium perchlorate is exceeded, and a slurry of ammonium perchlorate crystals suspended in residual mother liquor is formed. From an unagitated decantation zone in the crystallizer 16 there is decanted mother liquor comprising 179.5 parts of water, 27.1 parts of ammonium perchlorate, and 143.6 parts of sodium perchlorate, which is removed through line 24 and conveyed to the sodium bicarbonate precipitator 4. A slurry of crystalline ammonium perchlorate in mother liquor is withdrawn from the second stage crystallizer 16 through line 19 and conveyed to filter 20. Adherent mother liquor is washed from the ammonium perchlorate filter cake with water fed through line 26, and 100 parts of ammonium perchlorate crystals are transferred through conveyor line 21 to the ammonium perchlorate product recovery system 22. The mother liquor recovered from filter 20 and the wash liquor from filter 20 are combined and returned to the second stage crystallizer 16 through line 23. The effect of this return flow through line 23 is to add 70 parts of wash water to the ammonium perchlorate crystallizer 16.

Those skilled in the art will recognize that the process may be operated with quite different values for all of the parameters described in this example. Even the process flows may be altered while staying within the scope of this invention. For instance, instead of adding the sodium perchlorate to the sodium bicarbonate precipitator 4, it can be dissolved in the combined filtrate and wash liquors from filter 20 and carried through line 23 into the evaporator-crystallizer 16. The resulting increase in perchlorate ion concentration would cause more complete deposition of ammonium perchlorate. It is preferred not to add sodium perchlorate at this point in the process in order to avoid the accompanying increase in concentration of the sodium ion which is foreign to the ammonium perchlorate product.

The gas stripping evaporator 11 can be operated to allow the evaporated materials to be returned directly to the sodium bicarbonate precipitator 4 without condensation, thus saving much of the costs of the gas recovery condenser 13. When operating under these conditions, the evaporated water need not necessarily be sufficient to contain the ammonia and carbon dioxide in solution upon condensation.

The parameters of the first stage may be varied so that sodium will be precipitated as the carbonate or sesquicarbonate without departing from the scope of my invention. The ammonium compound to be used in my process can also have its anion selected from these ions as well as the bicarbonate ion.

Although I have illustrated my invention by the conversion of sodium perchlorate to ammonium perchlorate, it is not to be construed as being limited thereto, for other metallic perchlorates may also be useful in producing ammonium perchlorate by the process of my invention. For instance, it may soon be commercially practical to conduct the electrolysis of lithium or certain alkaline earth metal chlorides to form the corresponding lithium or alkaline earth perchlorates, especially calcium perchlorate. Strontium perchlorate and barium perchlorate also are to be included within the scope of my invention. Magnesium perchlorate and potassium perchlorate are not suitable. With such additional suitable metal perchlorate salts, the metal ion is precipitated as the corresponding metal carbonate in the first stage of my process, and ammonium perchlorate is precipitated in the second stage. The carbonate anion also can be derived from ammonia, carbon dioxide, and water. The application of my invention to other suitable metal perchlorate salts is illustrated in Examples 2 and 3 below.

*Example 2—Ammonium perchlorate from lithium perchlorate*

Lithium perchlorate, $LiClO_4$ (64 parts) and ammonia (20 parts) were dissolved in 226 parts of water. The solution was agitated in contact with one atmosphere of carbon dioxide at 50 degrees centigrade. A white precipitate was formed, which was removed by filtration. The filter cake was washed with water and dried. The resultant solid amounted to 15 parts and was identified as lithium carbonate ($Li_2CO_3$) by X-ray defraction. The clarified mother liquor is then concentrated by distillation and cooled with agitation to permit the crystallization of ammonium perchlorate, which is then separated by filtration and dried.

*Example 3—Ammonium perchlorate from calcium perchlorate*

Calcium perchlorate, $Ca(ClO_4)_2$ (284 parts) and ammonia (120 parts) were dissolved in 1,000 parts of water. The solution was agitated in contact with one atmosphere of carbon dioxide at 40 degrees centigrade. A white precipitate was formed, which was removed by filtration. The filter cake was washed with water and dried. The resultant solid was identified as calcium carbonate by X-ray defraction, and analyzed 0.18 percent perchlorate ion, showing little contamination with ammonium perchlorate. The clarified mother liquor was concentrated by distillation to a last crystal point of 80 degrees centigrade. This solution was cooled with agitation to 40 degrees centigrade, and the crystallized ammonium perchlorate was removed by filtration and dried. This dried ammonium perchlorate product amounted to 116 parts and contained less than 40 p.p.m. calcium. The completeness of the calcium precipitation was demonstrated by the fact that the clarified mother liquor recovered from the ammonium perchlorate precipitation contained only 48 micrograms of calcium per milliliter.

In a manner after Example 3, ammonium perchlorate is produced from strontium perchlorate and barium perchlorate, to first form strontium carbonate and barium carbonate, respectively, which precipitates out, and leaving ammonium perchlorate in solution, which thereafter can be crystallized out, such as by evaporative crystallization means.

Various changes and modifications may be made in the method and apparatus of this invention, certain preferred forms of which have been hereindescribed, without departing from the spirit and scope of this invention. These modifications are to be regarded as within the scope and purview of this invention.

I claim:

1. A process for producing ammonium perchlorate comprising reacting, in an aqueous medium, a metal perchlorate selected from the group consisting of sodium perchlorate, lithium perchlorate, calcium perchlorate, strontium perchlorate and barium perchlorate with an ammonium compound having an anion selected from the group consisting of bicarbonate, carbonate and sesquicarbonate by imposing a carbon dioxide partial pressure on the aqueous medium up to about 20 atmospheres absolute pressure while maintaining and correlating the temperature of the aqueous medium within the range of about 10 to 110 degrees centigrade and above the precipitation point of ammonium perchlorate to thereby precipitate the metal ion of said metal perchlorate as the metal salt of an anion of said ammonium compound, separating said metal salt from the resulting mother liquor and then changing at least one of the parameters of temperature, concentration of ammonium ion, concentration of perchlorate ion and water content of said resulting mother liquor to precipitate ammonium perchlorate therefrom.

2. The process according to claim 1 wherein the metal perchlorate is lithium perchlorate.

3. The process according to claim 1 wherein the metal perchlorate is calcium perchlorate.

4. The process according to claim 1 wherein the metal perchlorate is sodium perchlorate.

5. A process for the production of ammonium perchlorate from sodium perchlorate comprising reacting an aqueous solution of sodium perchlorate, ammonia and carbon dioxide by imposing a carbon dioxide partial pressure on the aqueous solution up to about 20 atmospheres absolute pressure while maintaining and correlating the temperature of the aqueous solution within the range of about 10 to 110 degrees centigrade and above the precipitation point of ammonium perchlorate to thereby precipitate sodium bicarbonate from said aqueous solution, separating the precipitated sodium bicarbonate from the resulting mother liquor and then evaporating carbon dioxide, ammonia, and water from said mother liquor and thereafter crystallizing ammonium perchlorate from the remaining aqueous solution.

6. A process for the production of ammonium perchlorate from sodium perchlorate comprising (1) reacting an aqueous solution of sodium perchlorate, ammonia and carbon dioxide by imposing a carbon dioxide partial pressure on the aqueous solution up to about 20 atmospheres absolute pressure while maintaining and correlating the temperature of the aqueous solution within the range of about 10 to 110 degrees centigrade and above the precipitation point of ammonium perchlorate to thereby crystallize sodium bicarbonate from said aqueous solution, (2) separating the crystals from the resulting mother liquor, (3) evaporating carbon dioxide, ammonia, and water from said mother liquor, (4) returning the volatilized products produced in step (3) to step (1) of the process and (5) crystallizing ammonium perchlorate from the residual aqueous medium produced in step (3).

7. A process for the production of ammonium perchlorate comprising (1) reacting an aqueous solution of sodium perchlorate, ammonia and carbon dioxide by imposing a carbon dioxide partial pressure on the aqueous solution of up to about 20 atmospheres absolute pressure while maintaining and correlating the temperature of the aqueous medium within the range of about 10 to 110 degrees centigrade and above the precipitation point of ammonium perchlorate to thereby precipitate sodium bicarbonate from said aqueous solution, (2) separating the precipitated sodium bicarbonate from the resulting mother liquor, (3) evaporating carbon dioxide, ammonia and water from the said mother liquor, (4) crystallizing ammonium perchlorate from the residual aqueous solution, (5) separating the crystallized ammonium perchlorate from the residual aqueous solution, and (6) returning said aqueous solution to step (1) of the process.

8. A process for the production of ammonium perchlorate from sodium perchlorate comprising reacting an aqueous solution of sodium perchlorate, ammonia and carbon dioxide by imposing a carbon dioxide partial pressure on the aqueous solution between about 2 to 4 atmospheres absolute pressure while maintaining and correlating the solution temperature between about 50 and 90 degrees centigrade and above the precipitation point of ammonium perchlorate to thereby precipitate sodium bicarbonate from said aqueous solution, separating the precipitated sodium bicarbonate from the resultant mother liquor, exaporating carbon dioxide, ammonia and water from the mother liquor, and crystallizing ammonium perchlorate from the remaining aqueous medium.

9. The process according to claim 8 wherein the ammonium perchlorate is crystallized by evaporative crystallization.

10. A continuous process for the production of ammonium perchlorate comprising reacting an aqueous solution of sodium perchlorate, ammonia and carbon dioxide by imposing a carbon dioxide partial pressure on the aqueous solution of between about 2 to 4 atmospheres absolute pressure while maintaining and correlating the solution temperature between about 50 and 90 degrees centigrade and above the precipitation point of ammonium perchlorate to thereby precipitate sodium bicarbonate from said aqueous solution, separating the precipitated sodium bicarbonate from the resultant mother liquor, evaporating carbon dioxide, ammonia and water from said mother liquor, condsensing the resulting vapors and returning the condensate for further reaction with sodium perchlorate, crystallizing ammonium perchlorate from the unevaporated mother liquor, separating the crystallized ammonium perchlorate from the mother liquor and returning the residual mother liquor for further reaction with ammonia, carbon dioxide and additional sodium perchlorate.

11. A continuous process for the production of ammonium perchlorate comprising (1) reacting an aqueous solution of sodium perchlorate, ammonia and carbon dioxide by imposing a carbon dioxide partial pressure on the aqueous solution of up to about 20 atmospheres absolute pressure while maintaining and correlating the temperature of the aqueous solution within the range of about 10 to 110 degrees centigrade and above the precipitation point of ammonium perchlorate to thereby precipitate sodium bicarbonate from said solution, (2) separating the precipitated sodium bicarbonate from the resultant mother liquor, (3) decanting mother liquor from an unagitated zone in the sodium bicarbonate precipitation zone, (4) evaporating carbon dioxide, ammonia and water from said decanted mother liquor, (5) condensing the resulting vapors, and returning the condensate to step (1) of the process, (6) crystallizing ammonium perchlorate from the unevaporated aqueous residue of step (4), (7) separating the crystallized ammonium perchlorate from the resultant aqueous solution and (8) returning the said resultant aqueous solution to step (1) of the process.

12. A process for the production of ammonium perchlorate comprising (1) reacting an aqueous solution of sodium perchlorate, ammonia and carbon dioxide by imposing a carbon dioxide partial pressure on the aqueous solution of up to about 20 atmospheres absolute pressure while maintaining and correlating the temperature of the aqueous solution within the range of 10 to 110 degrees centigrade and above the precipitation point of ammonium perchlorate to thereby precipitate essentially sodium bicarbonate, (2) separating the precipitated sodium bicarbonate from the resultant mother liquor, (3) decanting mother liquor from an unagitated zone in the sodium bicarbonate precipitation means, (4) evaporating carbon dioxide, ammonia and water from the decanted mother liquor, (5) condensing the resulting vapors and returning the condensate to step (1) of the process, (6) precipitating ammonium perchlorate from the unevaporated aqueous residue of step (4), (7) separating the precipitated ammonium perchlorate from the resultant aqueous solution (8) decanting an aqueous solution from an unagitated zone in the ammonium perchlorate crystallization means and (9) returning the decanted aqueous solution of step (8) to step (1) of the process.

References Cited by the Examiner
UNITED STATES PATENTS

| | | | |
|---|---|---|---|
| 1,273,477 | 7/1918 | Given | 23—85 |
| 2,739,873 | 3/1956 | Schumacher | 23—85 |
| 3,105,735 | 10/1963 | Ayerst | 23—85 |

MAURICE A. BRINDISI, *Primary Examiner.*